No. 630,229. Patented Aug. 1, 1899.
G. P. B. HOYT.
ENGINE.
(Application filed Nov. 8, 1898.)
(No Model.)

WITNESSES:

INVENTOR
Gabriel P. B. Hoyt
BY
ATTORNEYS.

UNITED STATES PATENT OFFICE.

GABRIEL P. B. HOYT, OF NEW YORK, N. Y.

ENGINE.

SPECIFICATION forming part of Letters Patent No. 630,229, dated August 1, 1899.

Application filed November 8, 1898. Serial No. 695,850. (No model.)

*To all whom it may concern:*

Be it known that I, GABRIEL P. B. HOYT, of the city of New York, (Jamaica,) borough of Queens, in the county of Queens and State of New York, have invented a new and Improved Engine, of which the following is a full, clear, and exact description.

The object of the invention is to provide a new and improved engine which is simple and durable in construction, very effective in operation, adapted to run at a high rate of speed, and arranged to transmit the motion given to the piston by the motive agent to shafts without much, if any, shock or jar.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in all the figures.

Figure 1:
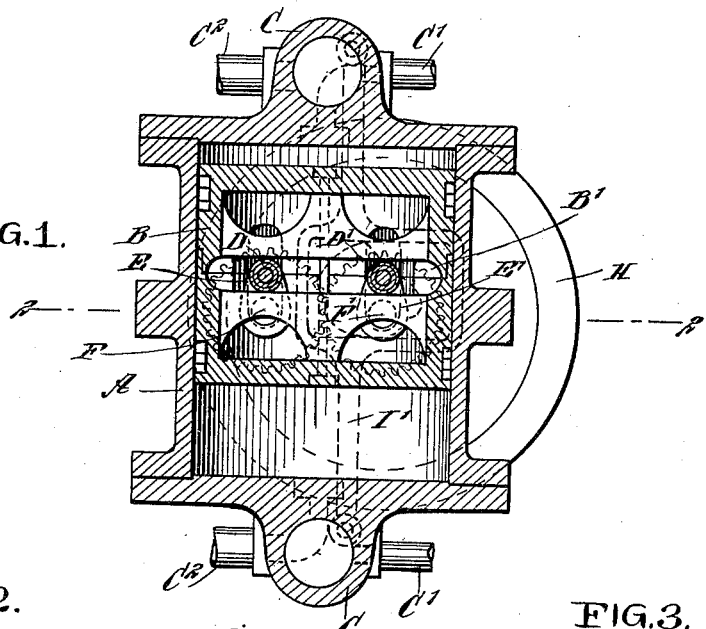
Figure 2:
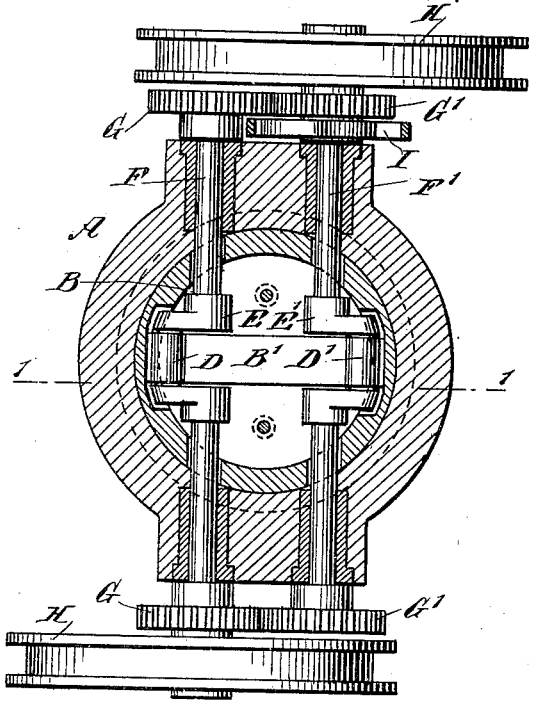
Figure 3:
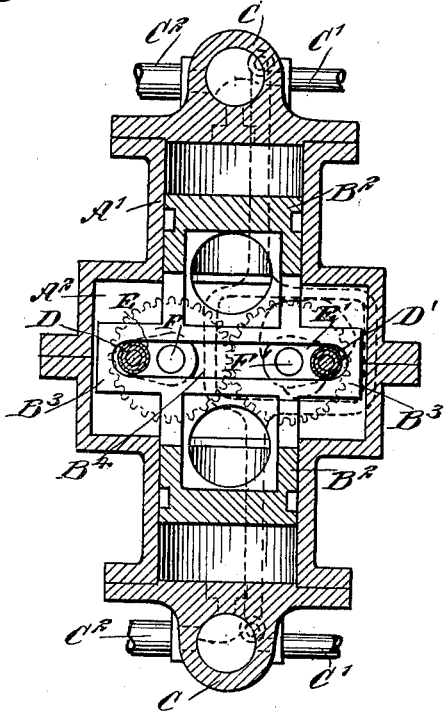

Figure 1 is a sectional side elevation of the improvement on the line 1 1 in Fig. 2. Fig. 2 is a sectional plan view of the same on the line 2 2 in Fig. 1, and Fig. 3 is a sectional side elevation of a modified form of the improvement.

The improved engine illustrated in Figs. 1 and 2 is provided with a cylinder A, in which reciprocates a piston B, actuated by a suitable motive agent admitted to and exhausted from the ends of the cylinder by suitable valves C, as indicated in Fig. 1, each valve having a supply-pipe C', connected with a suitable source of supply, and an exhaust-pipe $C^2$ for carrying off the exhaust motive agent.

In the piston B, at or near the middle thereof, is arranged a transversely-extending elongated slot B', in which travel wrist-pins D D' of crank-arms E E', respectively secured on shafts F F', respectively journaled in suitable bearings in the cylinder A, as will be readily understood by reference to Fig. 2, said shafts passing through vertically-disposed elongated slots in the walls of the cylinder to allow free reciprocating motion of the piston in the cylinder. The outer ends of the shafts F F' are connected with each other by suitable gear-wheels G G', and each of said shafts is provided with a fly-wheel H.

It is evident that when the motive agent alternately admitted to the ends of the cylinder reciprocates the piston B therein then a continuous rotary motion is given to the two shafts F F' by the action of the slotted piston on the crank-arms E E', engaging with their wrist-pins the slot B' in the piston. As the two shafts F F' are geared together, it is evident that a uniform rotary motion is given to the said two shafts without shock or jar, especially when the piston starts on the return stroke, as the two shafts rotate in opposite directions, due to the gearing connecting the outer ends of the shafts with each other. The piston is always perfectly balanced, as the wrist-pins, revolved oppositely by said gear, are at all positions of the stroke equal distances from the center of the piston on opposite sides of the center line.

As illustrated in Fig. 1, a cylinder of a large diameter and having a piston of a short stroke is employed; but in order to obtain a longer stroke with a piston of less diameter it is necessary to provide the cylinder A' (see Fig. 3) with an enlargement $A^2$ at or near the middle for receiving the enlarged slotted middle portion $B^3$ of the piston $B^2$. The operation is the same as above described with reference to Figs. 1 and 2—that is, the slot $B^4$ in the piston engages the wrist-pins D D' of the crank-arms E E', secured on the shafts F F', respectively.

As shown in Fig. 2, the valves C for admitting and exhausting the motive agent are actuated from one of the shafts by providing the same with a suitable cam I, actuating a link I', (see Fig. 1,) connected with the valve-plugs of the valves C. It is evident, however, that other suitable means may be employed for actuating the valves, as the latter instead of being oscillating valves may be in the form of the usual slide-valves, if desired.

As the shafts F F' rotate in opposite directions, the power can be transmitted from either shaft, according to the direction in which the machinery to be driven is to be run, and, if desired, each shaft may be provided with a fast and loose pulley connected by belts with machines, one of which runs forward and the other backward, as the case may be. By the arrangement described a uniform rotary motion is given to the two shafts, jar and shock is completely avoided, and the engine can be run at a very high rate of speed.

Having thus fully described my invention, I claim as new and desire to secure by Letters Patent—

1. An engine, comprising a cylinder, a piston mounted to reciprocate therein and provided with an elongated slot, crank-arms having wrist-pins extending into said slot, shafts carrying said crank-arms, and gear-wheels secured on said shafts and in mesh with each other, substantially as shown and described.

2. An engine, comprising a cylinder, a piston mounted to reciprocate therein and provided with an elongated slot, crank-arms having wrist-pins extending into said slot, shafts carrying said crank-arms, gear-wheels secured on said shafts and in mesh with each other, valves for controlling the admission to and exhaust of the motive agent from the cylinder, and a valve-gear operated from one or both of said shafts and connected with said valves, substantially as shown and described.

3. In an engine, the combination of a cylinder, a piston mounted to move therein, two shafts revolubly mounted in the cylinder and geared with each other, and a crank attached to each shaft, the cranks being oppositely disposed and having their wrist-pins in sliding connection with the piston, whereby to turn the shafts upon the movement of the piston.

GABRIEL P. B. HOYT.

Witnesses:
 THEO. G. HOSTER,
 JNO. M. RITTER.